(12) United States Patent
Kamimura et al.

(10) Patent No.: US 10,706,223 B2
(45) Date of Patent: Jul. 7, 2020

(54) NOTIFICATION OF RECOMMENDATION INFORMATION BASED ON ACQUIRED EMOTION INFORMATION OF WRITER

(71) Applicant: FUJI XEROX CO., LTD., Tokyo (JP)

(72) Inventors: Rumi Kamimura, Kanagawa (JP); Takehito Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 2 days.

(21) Appl. No.: 15/646,101

(22) Filed: Jul. 11, 2017

(65) Prior Publication Data
US 2018/0276190 A1    Sep. 27, 2018

(30) Foreign Application Priority Data
Mar. 24, 2017  (JP) .................. 2017-058888

(51) Int. Cl.
*G06F 17/00* (2019.01)
*G06F 40/169* (2020.01)
*G06F 40/30* (2020.01)
*G06F 40/289* (2020.01)

(52) U.S. Cl.
CPC .......... *G06F 40/169* (2020.01); *G06F 40/289* (2020.01); *G06F 40/30* (2020.01)

(58) Field of Classification Search
CPC ............... G06F 17/2785; G06F 17/241; G06F 2203/011
See application file for complete search history.

(56) References Cited

U.S. PATENT DOCUMENTS

| | | | |
|---|---|---|---|
| 7,089,504 B1 * | 8/2006 | Froloff | G06F 17/241 715/764 |
| 8,271,902 B1 * | 9/2012 | Mangini | H04M 1/72544 715/763 |
| 9,304,621 B1 * | 4/2016 | Wakim | G06F 1/1692 |
| 10,489,509 B2 * | 11/2019 | Alam | G06F 3/04817 |
| 2009/0063992 A1 * | 3/2009 | Gandhi | G06F 3/011 715/752 |
| 2012/0124122 A1 | 5/2012 | el Kaliouby et al. | |
| 2013/0185657 A1 * | 7/2013 | Gunawardena | G06F 16/48 715/753 |
| 2014/0074943 A1 * | 3/2014 | Kanevsky | A61B 5/165 709/206 |
| 2014/0223462 A1 * | 8/2014 | Aimone | A61B 5/0476 725/10 |
| 2014/0350349 A1 * | 11/2014 | Geurts | A61B 5/0022 600/300 |
| 2016/0063874 A1 * | 3/2016 | Czerwinski | G09B 5/06 434/236 |
| 2018/0226073 A1 * | 8/2018 | Hodge | G10L 15/1822 |

FOREIGN PATENT DOCUMENTS

JP    2014501967    1/2014

* cited by examiner

*Primary Examiner* — Scott T Baderman
*Assistant Examiner* — Barbara M Level
(74) *Attorney, Agent, or Firm* — JCIPRNET (57) ABSTRACT

An information processing apparatus includes an emotion information acquisition unit that acquires emotion information of a sentence information writer who writes sentence information, and a recommendation information notification unit that makes a notification of recommendation information based on the emotion information acquired by the emotion information acquisition unit.

8 Claims, 9 Drawing Sheets

FILTERING

NOTIFICATION OF RECOMMENDATION INFORMATION BASED ON ACQUIRED EMOTION INFORMATION OF WRITER

CROSS-REFERENCE TO RELATED APPLICATIONS

This application is based on and claims priority under 35 USC 119 from Japanese Patent Application No. 2017-058888 filed Mar. 24, 2017.

BACKGROUND

Technical Field

The present invention relates to an information processing apparatus, an information processing system, and a non-transitory computer readable medium.

SUMMARY

Since the emotion when a sentence writer writes a sentence is not correctly conveyed to a reader, a misunderstanding in communication arises and eventually the relationship between the people concerned is deteriorated in some cases.

According to an aspect of the invention, there is provided an information processing apparatus including an emotion information acquisition unit that acquires emotion information of a sentence information writer who writes sentence information; and a recommendation information notification unit that makes a notification of recommendation information based on the emotion information acquired by the emotion information acquisition unit.

BRIEF DESCRIPTION OF THE DRAWINGS

Exemplary embodiment(s) of the present invention will be described in detail based on the following figures, wherein.

DETAILED DESCRIPTION

Figure 1:
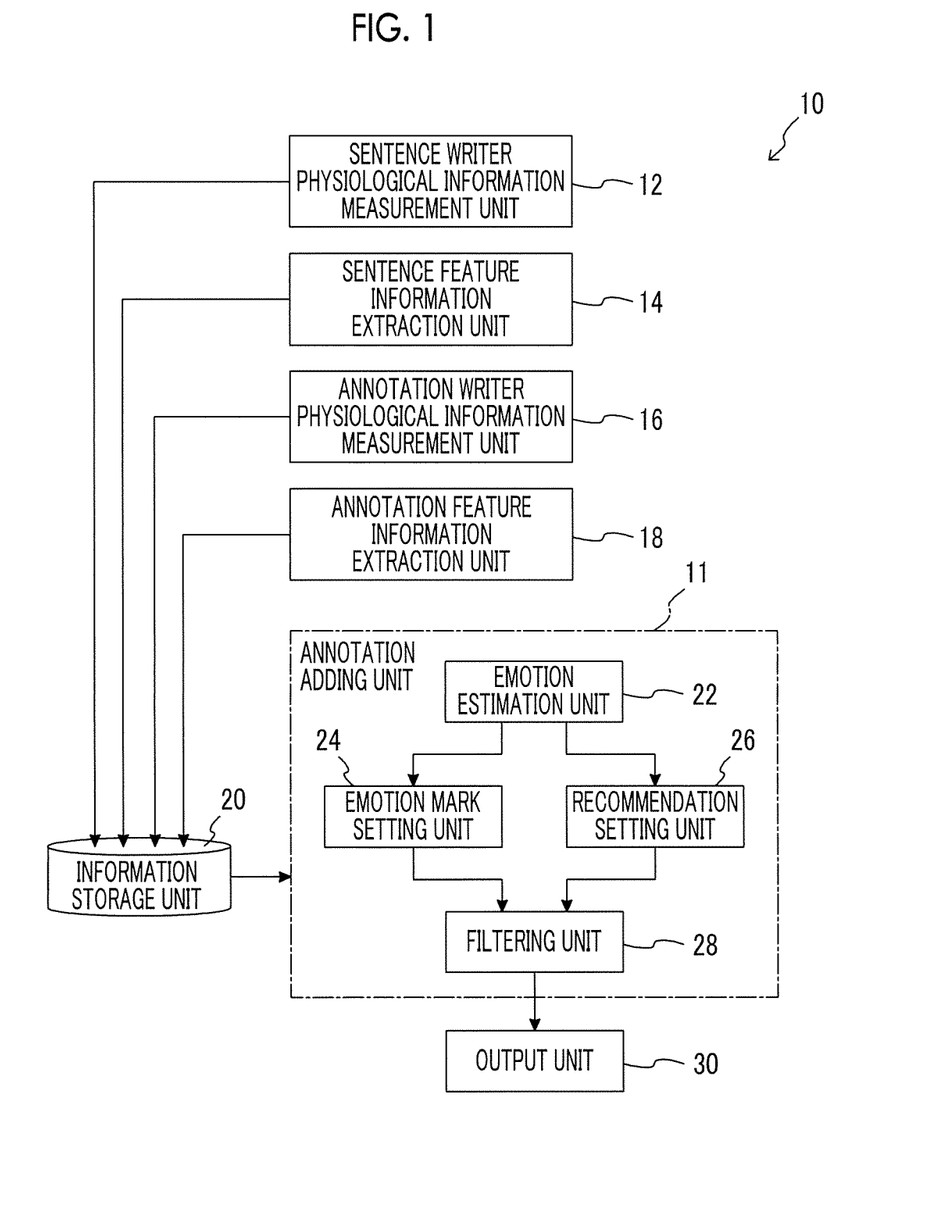
FIG. 1 is a block diagram illustrating a schematic configuration of an information processing apparatus according to an exemplary embodiment.

Hereinafter, exemplary embodiments of the present invention will be described with reference to the drawings. FIG. 1 is a block diagram illustrating a schematic configuration of an information processing apparatus 10 according to the exemplary embodiment. In addition, the information processing apparatus 10 according to the exemplary embodiment performs a process of adding annotations to sentence information.

The information processing apparatus 10 according to the exemplary embodiment is configured to include a sentence writer physiological information measurement unit 12, a sentence feature information extraction unit 14, an annotation writer physiological information measurement unit 16, an annotation feature information extraction unit 18, an information storage unit 20, an annotation adding unit 11, and an output unit 30.

The sentence writer physiological information measurement unit 12 measures the physiological information of the document writer who writes the sentence information constituting the document information. For example, the physiological information when a document writer writes document information to be reconsidered is measured. As the physiological information, for example, body temperature, pulse, respiration, heart rate, temperature, facial expression and the like can be illustrated as examples, but other physiological information may be measured. Further, the sentence writer physiological information measurement unit 12 measures physiological information using a web camera, various well-known sensors, and the like as an example.

The sentence feature information extraction unit 14 extracts feature information on the emotion of the document writer included in the sentence information constituting the written document information. For example, words, phrases, sentences, and the like related to emotion are extracted from the written sentence information as feature information as an example.

The annotation writer physiological information measurement unit 16 measures the physiological information of the annotation writer who writes the sentence information of the annotation on the document information. For example, the physiological information when an annotation writer writes sentence information of the annotation on the document information to be reconsidered is measured. As the physiological information, for example, body temperature, pulse, respiration, heart rate, temperature, facial expression and the like can be illustrated as examples, but other physiological information may be measured. Further, the annotation writer physiological information measurement unit 16 measures physiological information using a web camera, various well-known sensors, and the like as an example.

The annotation feature information extraction unit 18 extracts feature information on the emotion of the annotation writer included in the written sentence information of the annotation. For example, words, phrases, sentences, and the like related to emotion are extracted from the written sentence information as feature information as an example.

The information storage unit 20 stores the measurement result of the sentence writer physiological information measurement unit 12, the extraction result of the sentence feature information extraction unit 14, the measurement result of the annotation writer physiological information measurement unit 16, the extraction result of the annotation feature information extraction unit 18, the document information to be reconsidered, or the like. Further, the information storage unit 20 previously stores information for estimating the emotion of the writer (at least one of the document writer and the annotation writer) who writes the document information. For example, as information for estimating emotion, information defining a value of physiological information (body temperature, pulse, respiration, heart rate, temperature, and the like) for each type of emotion, information such as sentence expression which is predetermined for each type of emotion, and the like are stored in the information storage unit 20. Alternatively, information defining feature information for each type of emotion, information defining values of physiological information for each intensity of emotion, and the like are stored in the information storage unit 20 as the information for estimating emotion.

The annotation adding unit 11 estimates the emotion of the writer (at least one of the document writer and the annotation writer) at the time of writing the sentence information, using each piece of information stored in the information storage unit 20, and performs a process of adding an emotion mark predetermined as the emotion information representing the estimated emotion as the annotation. In the exemplary embodiment, an example of adding an emotion mark to an annotation as emotion information has been described. However, the present invention is not limited thereto, and other emotion information such as characters representing emotion may be used. Further, as the emotion mark, various predetermined emoticons, facial images predetermined for feelings of people, and the like are applied as an example.

Specifically, the annotation adding unit 11 includes an emotion estimation unit 22, an emotion mark setting unit 24, a recommendation setting unit 26, and a filtering unit 28.

The emotion estimation unit 22 estimates the emotion of the writer who writes the sentence information, based on the information including the physiological information and the feature information stored in the information storage unit 20. Examples of the estimated emotion include joy, sadness, anger, give up, surprise, hatred, fear, or the like, but the emotion is not limited thereto. In the exemplary embodiment, the emotion of the document writer who writes the sentence information constituting the document information of a reconsideration target (so-called review target) or the emotion of the annotation writer who writes the document information of the annotation on the document information to be reconsidered is estimated. For example, the emotion estimation unit 22 performs estimation by reading emotion corresponding to the physiological information at the time of writing the sentence information and the feature information on the emotion included in the sentence information, from the information for estimating emotion stored in the information storage unit 20. Alternatively, the type of emotion may be estimated from the feature information on the emotion included in the sentence information, and the intensity of the emotion estimated from the physiological information at the time of writing the sentence information may be estimated. Since emotion is estimated by using a well-known technique such as analysis of mental state information, a detailed description will be omitted here. The estimation accuracy of emotion by the emotion estimation unit 22 may be improved by accumulating information to be stored in the information storage unit 20 for each individual and learning whether the estimation result of the emotion estimation unit 22 is correct or not. Further, the emotion estimation unit 22 may also perform estimation by considering the degree of emotion in addition to the type of emotion. For example, the degree of emotion may be estimated for each type of emotion in plural stages (for example, three stages, or the like).

The emotion mark setting unit 24 sets a predetermined emotion mark corresponding to the emotion estimated by the emotion estimation unit 22 in the annotation. For example, the emotion mark for each type of emotion is predetermined and stored in the information storage unit 20, the emotion mark corresponding to the emotion estimated by the emotion estimation unit 22 is read and set in the annotation. Alternatively, the emotion mark corresponding to the type and the degree of emotion is predetermined and stored in the information storage unit 20, and the emotion mark corresponding to the type and the degree of emotion estimated by the emotion estimation unit 22 are read and set in the annotation. As described above, the emotion marks are represented by emoticons, facial images, and the like as an example.

The recommendation setting unit 26 gives advice on contents to be handled to the person referring to the annotation, based on the estimation result of the emotion estimation unit 22. In other words, the recommendation setting unit 26 acquires emotion information, and makes a notification of recommendation information based on the acquired emotion information. For example, a comment predetermined for each type of emotion may be stored in the information storage unit 20, and a comment corresponding to the emotion estimated by the emotion estimation unit 22 may be read and advised as recommendation information. Alternatively, contents of correspondence in the past for each type of emotion (for example, correction contents for comments described in the annotation, or the like) are stored in the information storage unit 20, and correspondence contents corresponding to the emotion estimated by the emotion estimation unit 22 may be read and advised as recommendation information. Alternatively, a comment predetermined for each type of emotion and degree thereof may be stored in the information storage unit 20, and a comment corresponding to the type of the emotion estimated by the emotion estimation unit 22 and the degree of the emotion may be read and advised as recommendation information. In addition, the recommendation setting unit 26 may notify a paragraph with high priority to which an annotation is to be added, based on the emotion information estimated by the emotion estimation unit 22. For example, a paragraph of a sentence in which emotion information representing emotion of anger is estimated may be set as a paragraph with high priority to which an annotation is to be added, and notified.

The filtering unit 28 performs filtering so as to extract a predetermined emotion annotation, based on the emotion mark set by the emotion mark setting unit 24. For example, annotations are filtered with emotion of anger, and annotations to which an emotion mark representing emotion of anger is added are extracted. The emotion to be filtered may be a predetermined emotion or may be set when filtering. In addition, the filtering unit 28 may filter the recommendation information set by the recommendation setting unit 26 with a predetermined emotion, based on the emotion mark set by the emotion mark setting unit 24. For example, recommendation information may be filtered with emotion of anger, and recommendation information of an annotation to which an emotion mark representing emotion of anger is added may be extracted. Further, the filtering unit 28 may also perform filtering with the degree of emotion. For example, a predetermined type of emotion annotation with more than a predetermined degree may be extracted.

In addition, the output unit 30 outputs the document information to which the annotation filtered by the filtering unit 28 is added. As an example of the output, the document information to which the annotation is added may be displayed on a display such as a monitor. Alternatively, the document information to which the annotation is added may be transmitted to another information processing apparatus or the like.

Next, a process at the time of writing an annotation performed in the information processing apparatus 10 according to the exemplary embodiment which is configured as described above will be described.

Figure 2:
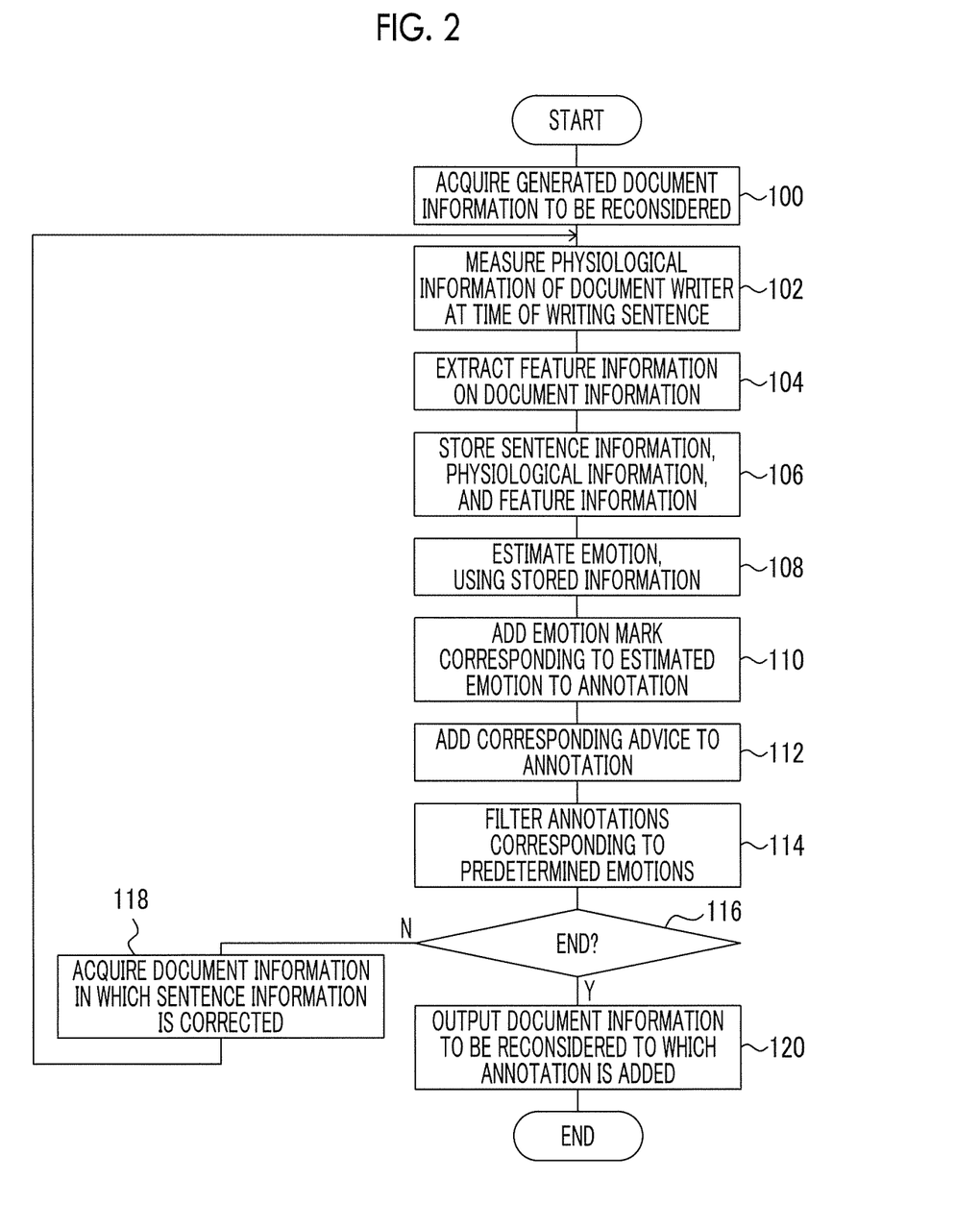
FIG. 2 is a flowchart showing an example of a flow of a process in a case where an emotion mark representing emotion at the time of writing document information to be reconsidered is added as an annotation in the information processing apparatus according to the exemplary embodiment.

First, a description will be given about a specific process in the case where an emotion mark representing emotion at the time of writing document information to be reconsidered is added as an annotation. FIG. 2 is a flowchart showing an example of a flow of a process in a case where an emotion mark representing emotion at the time of writing document information to be reconsidered is added as an annotation in the information processing apparatus 10 according to the exemplary embodiment. In addition, the process of FIG. 2 is a process when a document writer who writes document information to be reconsidered adds an annotation to ask reconsideration of the document information to be reconsidered, and is started, for example, in the case where a predetermined instruction to write the document information to be reconsidered is performed.

In step 100, the sentence feature information extraction unit 14 acquires the written document information to be reconsidered, and the process proceeds to step 102.

In step 102, the sentence writer physiological information measurement unit 12 measures the physiological information of the document writer at the time of writing the sentence information constituting the document information, and the process proceeds to step 104.

In step 104, the sentence feature information extraction unit 14 extracts feature information on the emotion of the document writer included in the sentence information constituting the document information to be reconsidered, and the process proceeds to step 106. It is to be noted that the processing sequence of steps 102 and 104 may be reversed and the process of step 102 may be executed after the process of step 104 is executed.

In step 106, the information storage unit 20 stores the sentence information acquired by the sentence feature information extraction unit 14, the physiological information measured by the sentence writer physiological information measurement unit 12, and the feature information extracted by the sentence feature information extraction unit 14, and the process proceeds to step 108.

In step 108, the emotion estimation unit 22 estimates the emotion at the time of writing the sentence of the document writer who writes the document information to be reconsidered, using each piece of information stored in the information storage unit 20, and the process proceeds to step 110. For example, the emotion estimation unit 22 acquires from the information storage unit 20, the physiological information at the time of writing the sentence information constituting the document information to be reconsidered and the feature information of the sentence information constituting the document information to be reconsidered, and estimates the emotion of the document writer at the time of writing the document information to be reconsidered, based on the acquired information.

Figure 3:
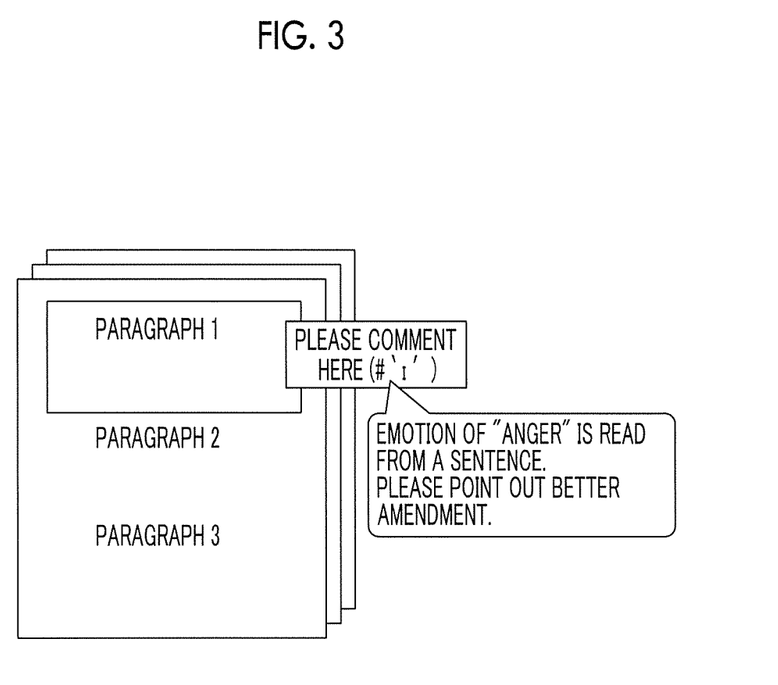
FIG. 3 is a diagram showing an example in which an emotion mark representing emotion at the time of writing document information to be reconsidered is added as an annotation.

In step 110, the emotion mark setting unit 24 adds a predetermined emotion mark corresponding to the emotion estimated by the emotion estimation unit 22 to the annotation, and the process proceeds to step 112. For example, as shown in FIG. 3, the emotion mark setting unit 24 adds an emotion mark (in FIG. 3, (#'I')) as an annotation, in addition to "please comment here", for each paragraph of the document information to be reconsidered.

In step 112, the recommendation setting unit 26 sets the advice corresponding to the emotion estimated by the emotion estimation unit 22 in the annotation, and the process proceeds to step 114. That is, the recommendation setting unit 26 acquires the emotion information estimated by the emotion estimation unit 22, and sets advice corresponding to the acquired emotion information in an annotation as recommendation information. For example, as shown in FIG. 3, the recommendation setting unit 26 sets "Emotion of "anger" is read from a sentence. Please point out a better amendment." as recommendation information.

Figure 4:
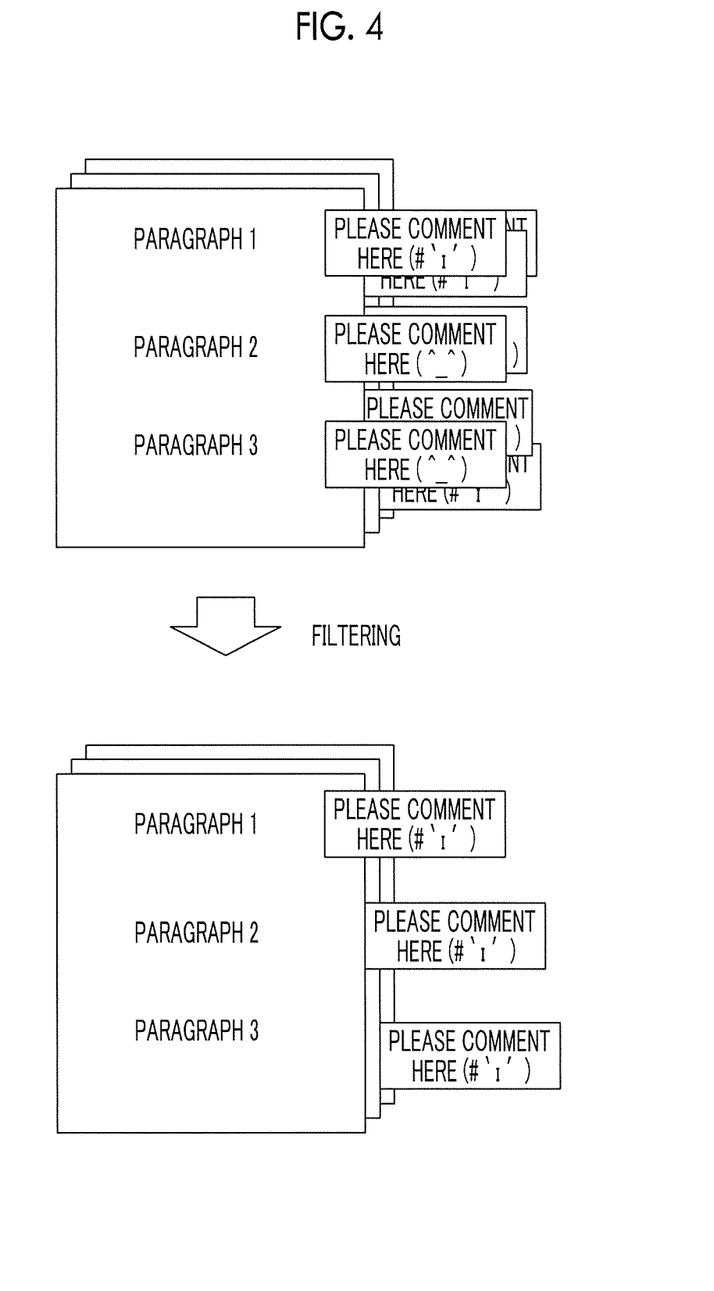
FIG. 4 is a diagram showing an example in which filtering is performed with emotion of anger at the time of writing document information to be reconsidered, and an annotation to which an emotion mark representing emotion of anger is added is filtered and extracted.

In step 114, the filtering unit 28 filters annotations corresponding to predetermined emotion, and the process proceeds to step 116. As shown in FIG. 4, for example, the filtering unit 28 performs filtering with emotion of anger, and filters and extracts annotations to which emotion marks representing emotion of anger are added. In addition, emotion with which filtering is performed may be set in advance, or may be set when the document writer performs filtering. Further, the process of step 114 may be omitted. Alternatively, in a case where the recommendation information is set by the recommendation setting unit 26, in step 114, the filtering unit 28 may filter the recommendation information set by the recommendation setting unit 26 with predetermined emotion, based on the emotion mark set by the emotion mark setting unit 24, and may extract recommendation information for the predetermined emotion. In a case where the degree of emotion can also be discriminated, the recommendation information may be filtered with the degree of emotion, and recommendation information for a predetermined degree of emotion may be extracted.

In step 116, the output unit 30 determines whether or not to end adding of the annotation for reconsideration to the document information to be reconsidered. As an example, the determination is made as to whether or not the document writer has instructed termination. In a case where the determination is negative, the process proceeds to step 118, and in a case where the determination is positive, the process proceeds to step 120.

In step 118, the sentence feature information extraction unit 14 acquires document information to be reconsidered in which the sentence information is corrected, the process returns to step 102, and the above-described processes are repeated.

On the other hand, in step 120, the output unit 30 outputs the document information to which the annotation is added, and a series of processes are ended. For example, as described above, the output unit 30 may display document information to which an annotation is added, on a display such as a monitor, or may transmit the document information to which an annotation is added, to another information processing apparatus or the like. Here, the document writer may confirm the annotation to which the emotion mark is added, output by the output unit 30, and performs deleting of annotations, adding of comments, and the like.

Figure 5:
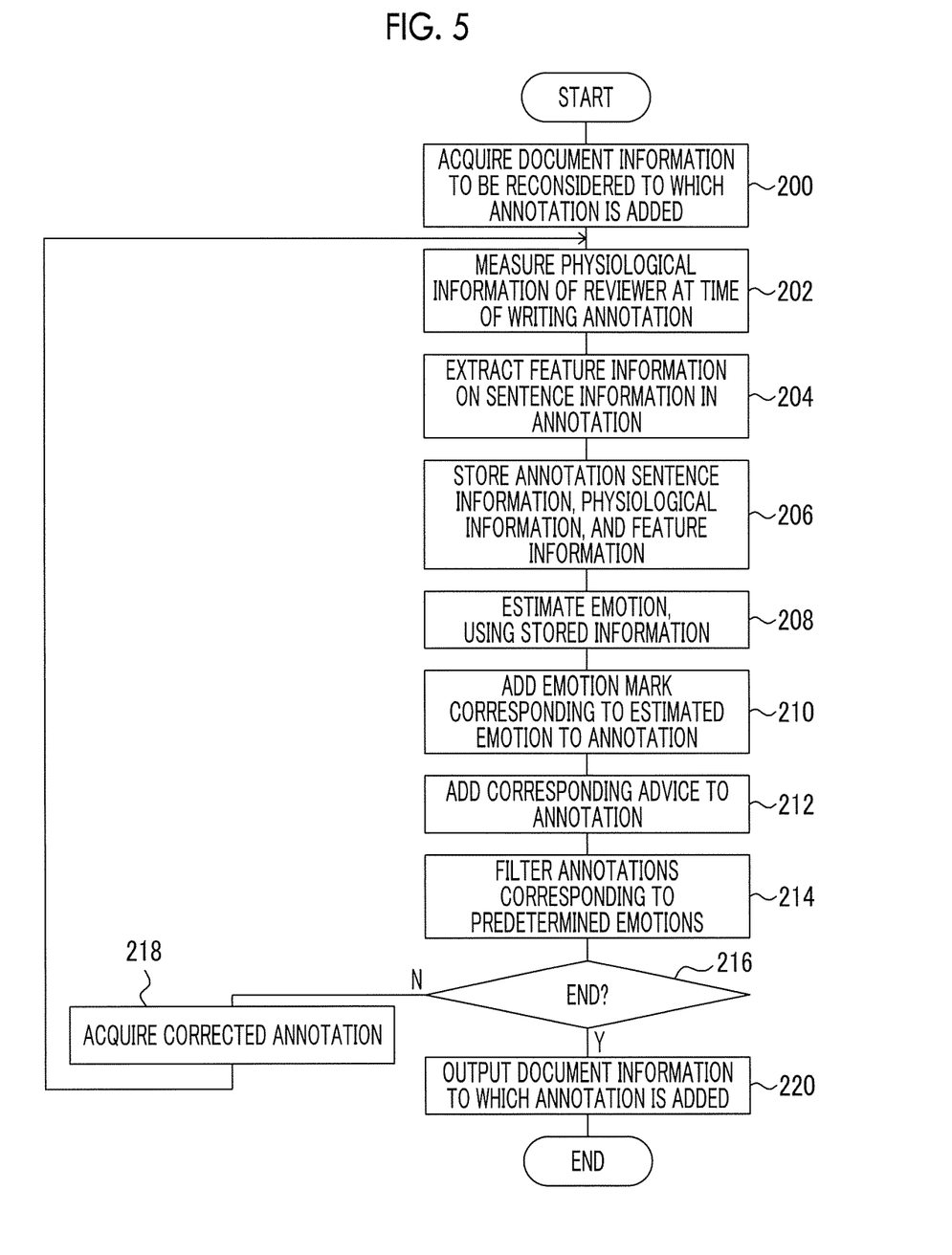
FIG. 5 is a flowchart showing an example of a flow of a process in a case where an emotion mark representing emotion at the time of writing sentence information of an annotation on document information to be reconsidered is added as an annotation, in the information processing apparatus according to the exemplary embodiment.

Next, a description will be given about a specific process in the case where an emotion mark representing emotion at the time of writing sentence information of an annotation on the document information to be reconsidered is added as an annotation. FIG. 5 is a flowchart showing an example of a flow of a process in a case where an emotion mark representing emotion at the time of writing sentence information of an annotation on document information to be reconsidered is added as an annotation, in the information processing apparatus 10 according to the exemplary embodiment. In addition, the process of FIG. 5 is a process when an annotation writer who writes sentence information of an annotation on the document information to be reconsidered writes an annotation, and is started, for example, in the case where a predetermined instruction to write the annotation on the document information to be reconsidered is performed.

In step 200, the annotation feature information extraction unit 18 acquires the document information to be reconsidered to which the annotation is added, and the process proceeds to step 202.

In step 202, the annotation writer physiological information measurement unit 16 measures the physiological information of the annotation writer at the time of writing the sentence information of the annotation on the document information to be reconsidered, and the process proceeds to step 204.

In step 204, the annotation feature information extraction unit 18 extracts feature information on the emotion of the annotation writer included in the sentence information of the annotation, and then the process proceeds to step 206. It is to be noted that the processing sequence of steps 202 and 204 may be reversed and the process of step 202 may be executed after the process of step 204 is executed.

In step 206, the information storage unit 20 stores the sentence information of the annotation acquired by the annotation feature information extraction unit 18, the physiological information measured by the annotation writer physiological information measurement unit 16, and the feature information extracted by the annotation feature information extraction unit 18, and the process proceeds to step 208.

In step 208, the emotion estimation unit 22 estimates the emotion of the annotation writer who writes the sentence information of the annotation on the document information to be reconsidered, using each piece of information stored in the information storage unit 20, and the process proceeds to step 210. For example, the physiological information at the time of writing the sentence information of the annotation on the document information to be reconsidered and the feature information of the annotation on the document information to be reconsidered are acquired from the information storage unit 20, and the emotion of the annotation writer at the time of writing the sentence information of the annotation on the document information to be reconsidered is estimated, based on the acquired information.

Figure 6:
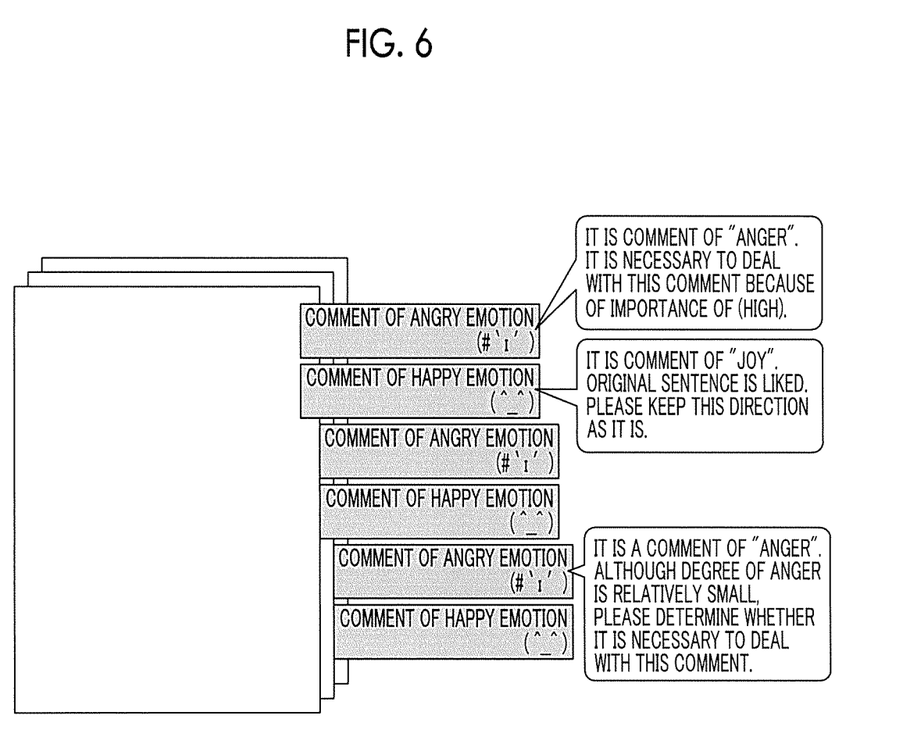
FIG. 6 is a diagram showing an example in which comment and emotion marks for document information to be reconsidered are added as annotations.

In step 210, the emotion mark setting unit 24 adds a predetermined emotion mark corresponding to the emotion estimated by the emotion estimation unit 22 to the annotation, and the process proceeds to step 212. For example, as shown in FIG. 6, the emotion mark setting unit 24 adds comments and emotion marks for the document information to be reconsidered as annotations. FIG. 6 shows an example in which an annotation including "a comment of angry emotion" and an emotion mark ((#'I')) or an annotation including "a comment of happy emotion" and an emotion mark ( ^_^ ) is added to each page.

In step 212, the recommendation setting unit 26 sets the advice corresponding to the emotion estimated by the emotion estimation unit 22 in the annotation, and the process proceeds to step 214. That is, the recommendation setting unit 26 acquires the emotion information from the emotion estimation unit 22, and sets advice corresponding to the acquired emotion information in an annotation as recommendation information. For example, as shown in FIG. 6, the recommendation setting unit 26 sets comments such as "It is a comment of "anger". It is necessary to deal with this comment because this comment has importance (high)", "It is a comment of "Joy". The original sentence is liked. Please keep this direction as it is.", and "It is a comment of "anger". Although the degree of anger is relatively small, please determine whether it is necessary to deal with this comment.", as recommendation information.

Figure 7:
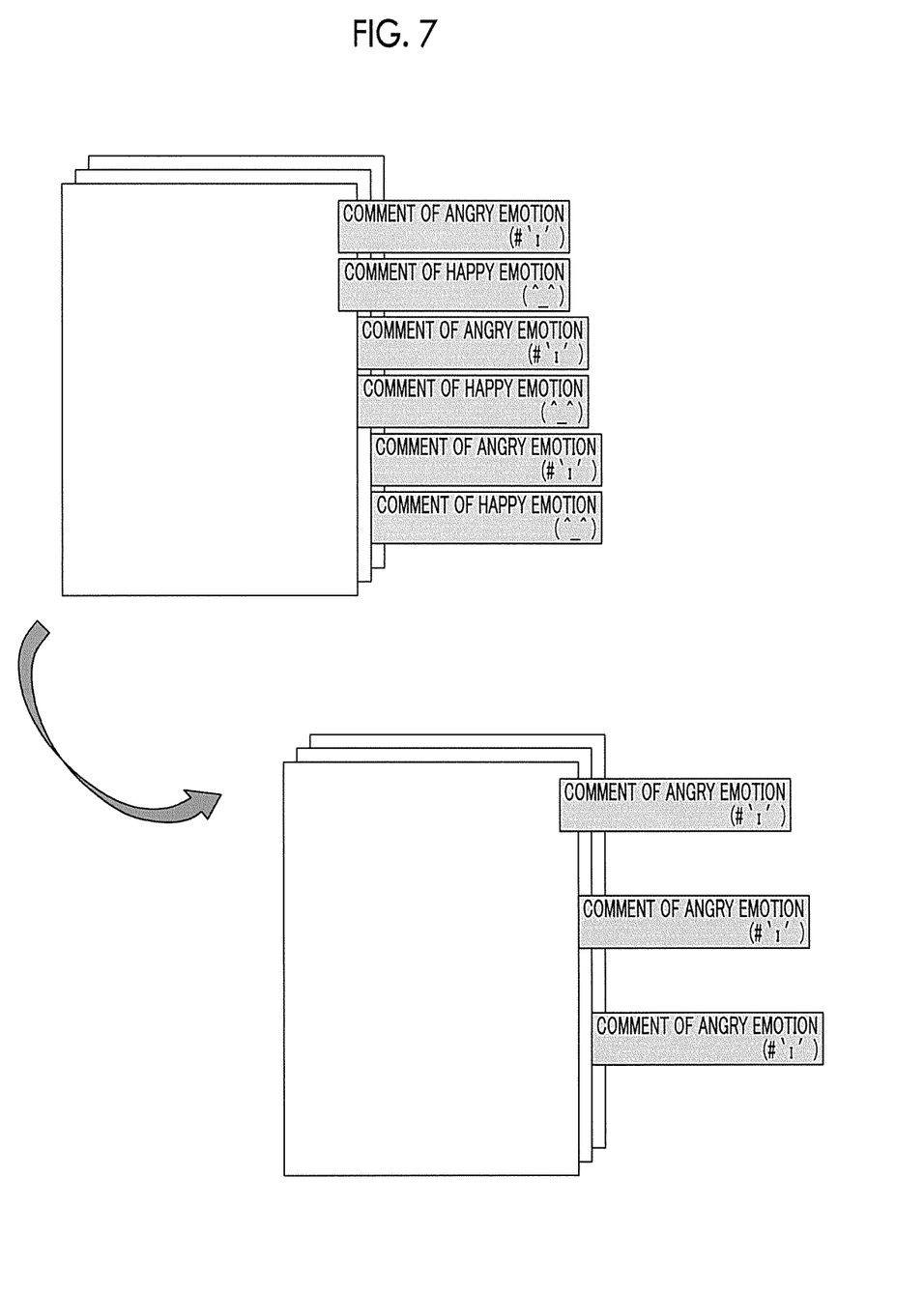
FIG. 7 is a diagram showing an example in which filtering is performed with emotion of anger at the time of writing an annotation, and an annotation to which an emotion mark representing emotion of anger is added is filtered and extracted.

In step 214, the filtering unit 28 filters annotations corresponding to predetermined emotion, and the process proceeds to step 216. As shown in FIG. 7, for example, the filtering unit 28 performs filtering with emotion of anger, and filters and extracts annotations to which emotion mark representing emotion of anger are added. In addition, emotion with which filtering is performed may be set in advance, or may be set when the document writer performs filtering. Further, the process of step 214 may be omitted. Alternatively, in a case where the recommendation information is set by the recommendation setting unit 26, in step 214, the filtering unit 28 may filter the recommendation information set by the recommendation setting unit 26 with the predetermined emotion, based on the emotion mark set by the emotion mark setting unit 24, and may extract recommendation information for the predetermined emotion. In a case where the degree of emotion can also be discriminated, the recommendation information may be filtered with the degree of emotion, and recommendation information on a predetermined degree of emotion may be extracted.

In step 216, the output unit 30 determines whether or not to end adding of the annotation on the document information to be reconsidered. As an example, the determination is made as to whether or not the annotation writer has instructed termination. In a case where the determination is negative, the process proceeds to step 218, and in a case where the determination is positive, the process proceeds to step 220.

Figure 8:
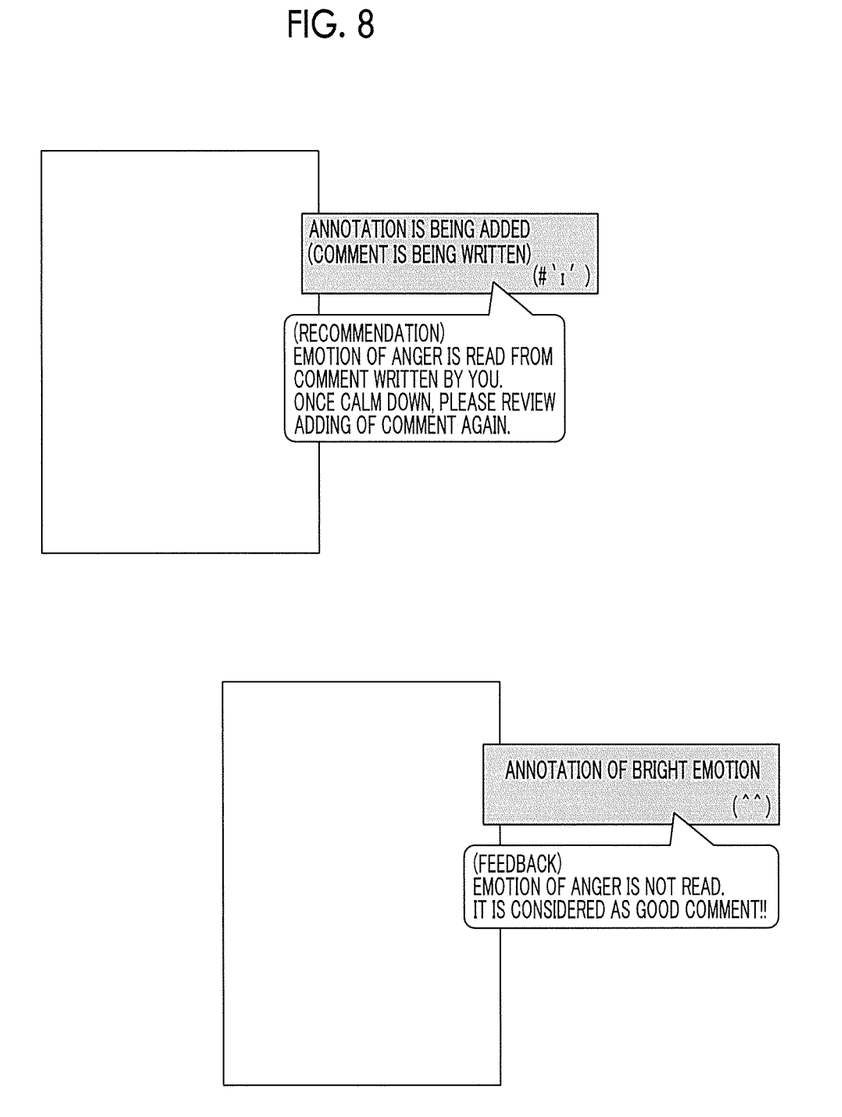
FIG. 8 is a diagram showing an example of a state in which an emotion mark is added in real time and advice which is recommendation information is added to an annotation.

In step 218, the annotation feature information extraction unit 18 acquires the corrected annotation, the process returns to step 202, and the above-described processes are repeated. In a case where the corrected annotation is acquired and the above processes are repeated, for example, as shown in FIG. 8, an emotion mark is added in real time and advice which is recommendation information ((recommendation) in FIG. 8) may be added to the annotation.

On the other hand, in step 220, the output unit 30 outputs the document information to which the annotation is added, and a series of processes are ended. For example, as described above, the output unit 30 may display document information to which an annotation is added, on a display such as a monitor, or may transmit the document information to which an annotation is added, to another information processing apparatus or the like. Here, the annotation writer may confirm the annotation to which the emotion mark is added, output by the output unit 30, and performs deleting of annotations, adding of comments, and the like.

Figure 9:
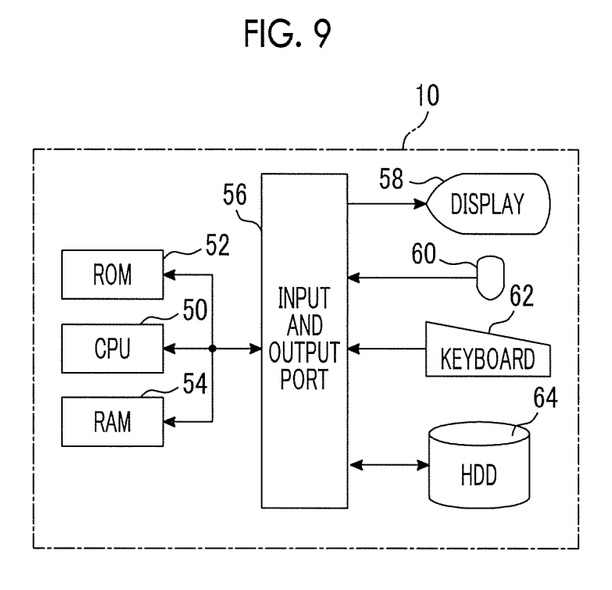
FIG. 9 is a block diagram showing a configuration example in a case where a computer executes a program so as to function as each unit of the information processing apparatus according to the exemplary embodiment.

As an example, the information processing apparatus 10 according to the exemplary embodiment may be configured to cause a computer to execute a program so as to cause the computer to function as each unit of the information processing apparatus 10 described above. In this case, for example, as shown in FIG. 9, the information processing apparatus 10 includes a CPU 50, a ROM 52, a RAM 54, and an input and output port 56. Storage devices such as a display 58, a mouse 60, a keyboard 62, and a hard disk (HDD) 64 are connected to the input and output port 56. Then, an information processing program for executing a process (processes of FIGS. 2 and 5) for adding annotations to the document information is stored in the hard disk 64, and the CPU 50 executes the information processing program to function as each unit.

Figure 10:
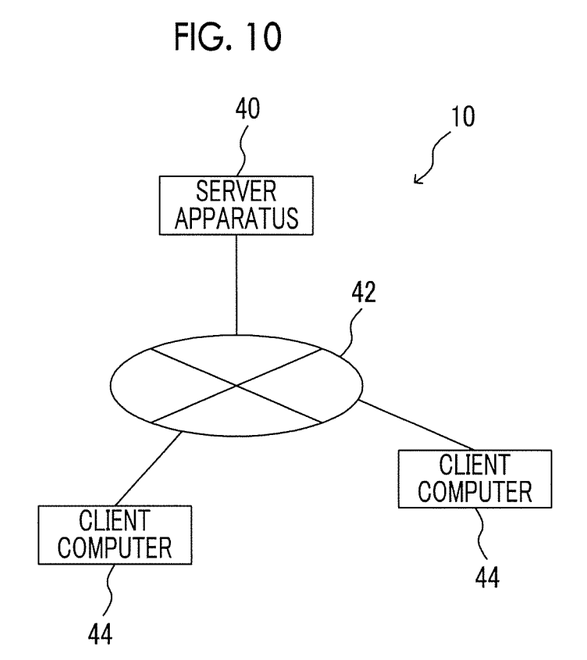
FIG. 10 is a diagram showing a configuration example in a case where the information processing apparatus according to the exemplary-embodiment is in the form of an information processing system constructed as a server network system.

Alternatively, as shown in FIG. 10, the information processing apparatus 10 may be in the form of an information processing system constructed as a server network system in which the server apparatus 40 and the client computer 44 are connected to a network. That is, in the case of applying the form of the information processing system, as shown in FIG. 10, the information processing apparatus 10 is configured by connecting the server apparatus 40 and plural client computers 44 to a communication unit 42 such as a network. As the communication unit 42, for example, various networks such as the Internet and Ethernet (registered trademark) are applied. In addition, the configuration of the information processing apparatus 10 shown in FIG. 9 is applied to each of the server apparatus 40 and the client computer 44. In addition, although FIG. 10 shows two client computers 44, the number is not limited to two. In the case of applying the form of the information processing system, as shown in FIG. 10, for example, the server apparatus 40 may have the function of the information storage unit 20, and the client computer 44 may have the functions of the sentence feature information extraction unit 14, the annotation feature information extraction unit 18, the annotation adding unit 11, and the output unit 30. Alternatively, the server apparatus 40 may have the functions of the information storage unit 20 and the annotation adding unit 11, and the client computer 44 may have the functions of the sentence feature information extraction unit 14, the annotation feature information extraction unit 18, and the output unit 30. The functions of the sentence writer physiological information measurement unit 12 and the annotation writer physiological information measurement unit 16 may be the functions of the client computer 44, or may be the functions of an apparatus other than the client computer 44. In addition, which one of the server apparatus 40 and the plural client computers 44 is to perform the function of each unit of the information processing apparatus 10 may be appropriately set.

In addition, the processes shown in FIGS. 2 and 5 performed by the information processing apparatus 10 according to the above exemplary embodiment may be a process performed by software, a process performed by hardware, or a combination of both. In addition, the processes performed in the information processing apparatus 10 may be stored as a program in a storage medium and be distributed.

In addition, the present invention is not limited to the above, and it goes without saying that various modifications can be made without departing from the scope of the invention, in addition to the above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising a processor, a sensor and a display, the processor is configured to:
   acquire a document to be reviewed;
   control the sensor to measure physiological information of a user who writes an annotation for the document when the user writes the annotation;
   estimate emotion information of the user when the user writes the annotation according to the measured physiological information and feature information extracted from contents of the annotation;
   add an emotion mark corresponding to the emotion information estimated by the processor to the annotation during a period when the user is writing the annotation;
   set recommendation information for the annotation based on the emotion mark added to the annotation;
   filter annotations to which a predetermined emotion mark corresponding to a predetermined emotion information is added to the annotations to generated filtered annotations;
   filter recommendation information for the annotations to which the predetermined emotion mark corresponding to the predetermined emotion information is added to the annotations to generate filtered recommendation information; and
   display the document with the filtered annotations and the filtered recommendation information on the display of the information processing apparatus.

2. The information processing apparatus according to claim 1,
   wherein the emotion information added to the annotation is a facial expression mark representing the emotion information.

3. The information processing apparatus according to claim 2,
   wherein the processor estimates the emotion information according to a plurality of types of predetermined information related to the writing of the annotation,
   wherein the processor accumulates the physiological information and the feature information associated with the user, and performs a training operation according to a correctness of the estimated emotion information, the accumulated physiological information and the accumulated feature information associated with the user, and
   wherein the facial expression mark is displayed differently depending on a plurality of types of predetermined information.

4. An information processing apparatus comprising a processor, a sensor and a display, the processor is configured to:

acquire, from the sensor, physiological information of a document writer when the document writer writes the document;
estimate feature information on an emotion from contents of the document written by the document writer when the document writer writes the document according to the measured physiological information and feature information extracted from the contents of the document;
add the emotion information to an annotation of the document during a period when the document writer is writing the document;
set recommendation information which is obtained based on the emotion information added to the annotation of the document and the feature information and recommends correspondence to be taken next by a reader of the document;
filter annotations to which a predetermined emotion information is added to the annotations to generated filtered annotations;
filter recommendation information for the annotations to which the predetermined emotion information is added to the annotations to generate filtered recommendation information; and
display the document with the filtered annotations and the filtered recommendation information.

5. The information processing apparatus according to claim 4, wherein the processor is further configured to
estimate the emotion when the document writer writes a paragraph, for each paragraph of the document.

6. The information processing apparatus according to claim 5,
wherein the processor makes a notification of a paragraph with high priority to which an annotation is to be added, based on the estimated emotion.

7. An information processing system comprising:
a client computer configured to acquire physiological information of a document writer and estimate feature information on an emotion from contents of a document written by the document writer when the document writer writes the document; and
a server computer configured to notify the client computer of recommendation information which is obtained based on the physiological information and the feature information and recommends correspondence to be taken next by a reader of the document,
wherein emotion information that is estimated according to the physiological information and the feature information is added to an annotation of the document during a period when the document writer is writing the document, annotations to which a predetermined emotion information is added to the annotations are filtered to generated filtered annotations, recommendation information for the annotations to which the predetermined emotion information is added to the annotations is filtered to generate filtered recommendation information, and the document with the filtered annotations and the filtered recommendation information is displayed to the document writer.

8. A non-transitory computer readable medium storing an information processing program causing a computer to function as the information processing apparatus according to claim 1.

* * * * *